United States Patent [19]

Winslow

[11] 4,317,199

[45] Feb. 23, 1982

[54] DIAGNOSTIC EXTENDER TEST APPARATUS

[75] Inventor: Alan K. Winslow, Hillsboro, Oreg.

[73] Assignee: Tektronix, Inc., Beaverton, Oreg.

[21] Appl. No.: 117,327

[22] Filed: Jan. 31, 1980

[51] Int. Cl.³ .............................................. G06F 11/22
[52] U.S. Cl. .................................................... 371/16
[58] Field of Search ............................. 371/16, 17, 18

[56] References Cited

U.S. PATENT DOCUMENTS 3,953,717  4/1976  Rottier et al. ......................... 371/17
4,231,087 10/1980  Hunsberger ....................... 371/16 X

OTHER PUBLICATIONS

Drinkhouse et al., "Test Device for Logic Cards", *IBM Tech. Disclosure Bulletin*, vol. 19, No. 5, Oct. 1976, pp. 1521-1522.
Beaven et al., "Card Testing a Microprocessor", *IBM Tech. Discl. Bulletin*, vol. 21, No. 4, Sep. 1978, pp. 1664-1665.
Finlay, "Diagnosing Computer-Controlled Machines", *IBM Technical Disclosure Bulletin*, vol. 21, No. 6, Nov. 1978, pp. 2252-2253.

*Primary Examiner*—David H. Malzahn
*Attorney, Agent, or Firm*—George T. Noe

[57] ABSTRACT

A diagnostic extender test apparatus for use with a processor-based product under test incorporates analog and digital measurement functions and logic stimulus functions to give a complete diagnostic picture of the product under test. The diagnostic extender test apparatus according to the preferred embodiment has its own microprocessor system and may be operated as a stand-alone instrument as well as an extension of a product under test.

7 Claims, 3 Drawing Figures

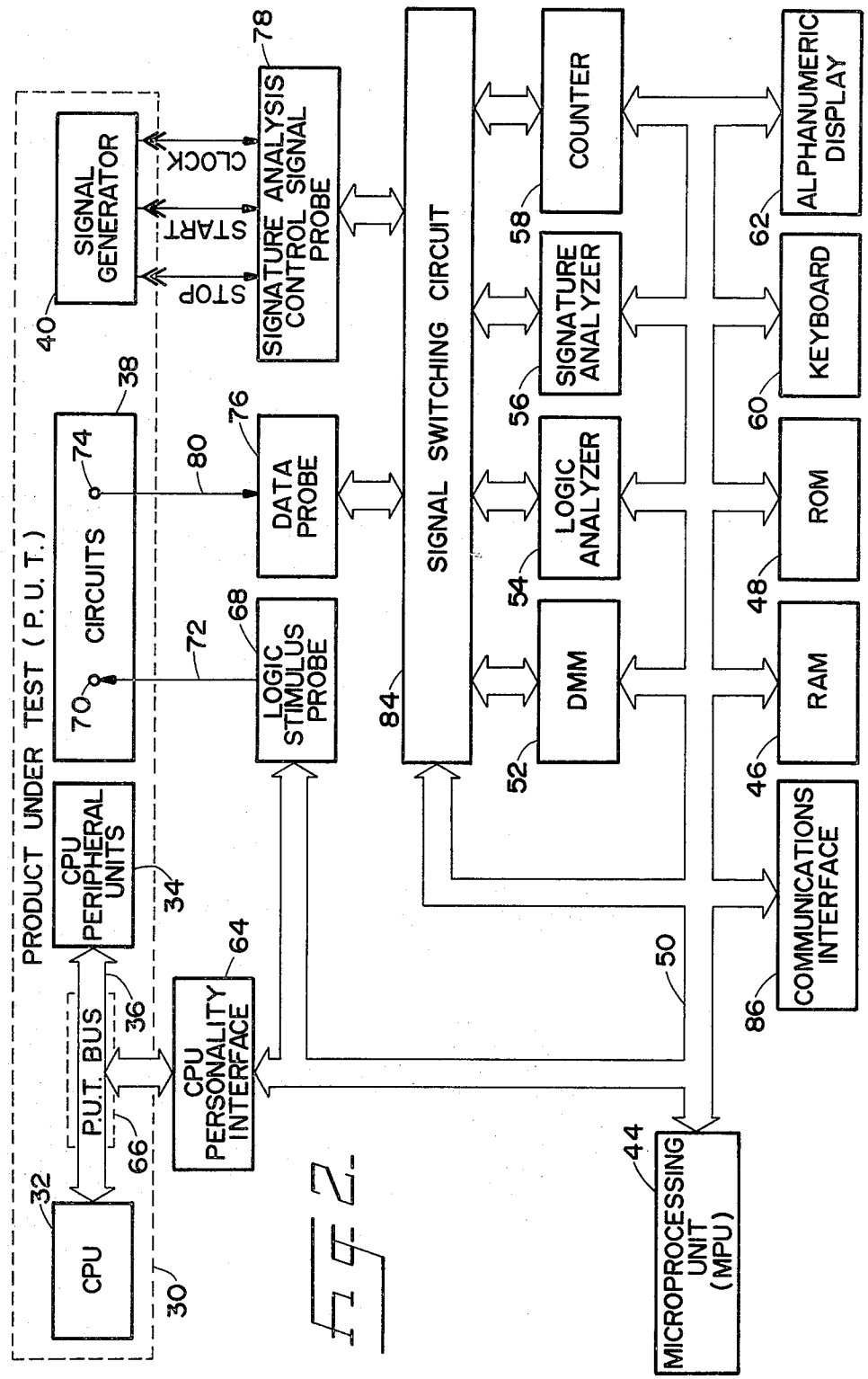

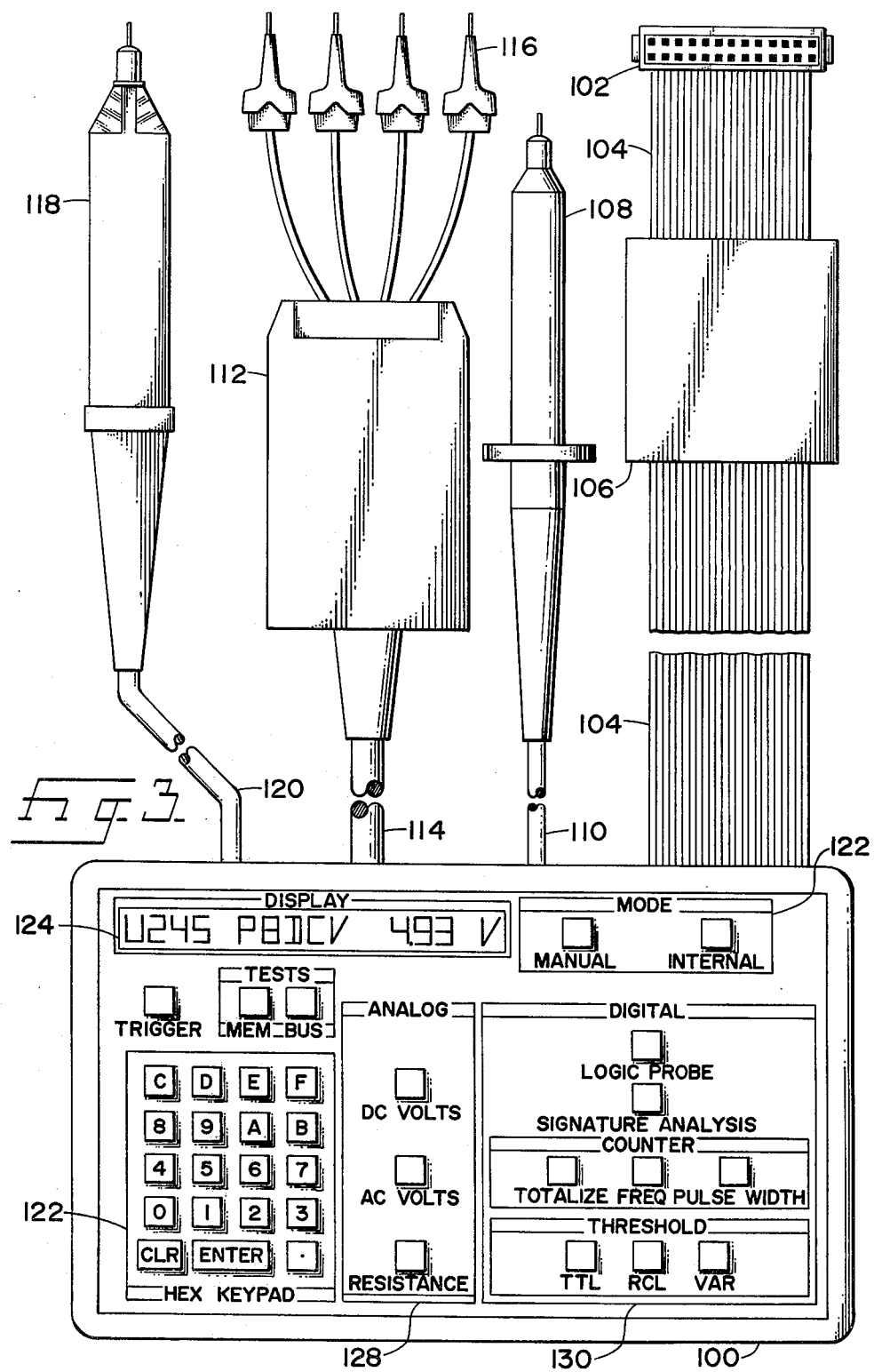

DIAGNOSTIC EXTENDER TEST APPARATUS

BACKGROUND OF THE INVENTION

The popularity of microprocessor-based systems and products has resulted in rapid development and production of new equipment to meet the public demand. Such equipment does not lend itself to diagnosis of faults or malfunctions by conventional testing and trouble-shooting instruments, such as oscilloscopes and the like, because information provided by these instruments is limited or incomplete, and subject to interpretation. Efforts to develop new diagnostic test equipment to service microprocessor-based systems has resulted in such techniques as self-diagnosis by following a predetermined checkout procedure, in-circuit emulation in which an external device emulates or imitates the functions of a host microprocessor, and signature analysis by probing for correct signatures at predetermined test points. While such diagnostic techniques are a step forward, they fail to provide a complete diagnostic capability. For example, self diagnostics are useless in situations where the kernel of the product is down, and prior external devices are typically complex and require considerable skill in operation, and do not give a complete diagnostic capability of both analog and digital measurements.

SUMMARY OF THE INVENTION

In accordance with the present invention, a diagnostic extender test apparatus for use with a processor-based product under test (PUT) incorporates analog and digital measurement functions and logic stimulus functions to give a complete diagnostic picture of the PUT, including fault location and performance checks.

The preferred embodiment of the diagnostic extender test apparatus includes its own microprocessor unit (MPU), random-access memories (RAM's), read-only memories (ROM's) and internal bus. The diagnostic fault location and measurement circuits are connected to the bus, and may include a variety of test functions, such as signature analysis, digital multimeter, logic probe, digital counter, and the like. A keyboard and alpha-numeric display may also be connected to the bus to provide a user interface. Test probes associated with the test and measurement circuits, such as data probes, logic probes, signature analysis probes, and linear probes for analog measurements, may be provided. As a stand-alone instrument, the diagnostic extender test apparatus may be utilized in a variety of test and measurement functions, including diagnosis of faults within the PUT kernel, i.e., those elements essential to the PUT's operation, such as its MPU, memories, clocks, bus, etc.

The diagnostic extender test apparatus also includes an external MPU communication port, allowing the apparatus to be connected to the bus of the PUT, where it becomes essentially a peripheral device of the MPU of the product under test. Of course, for this mode of operation, it is assumed that the test apparatus is set up in the correct address location of the PUT's MPU system, and that the internal diagnostics of the PUT have been written to communicate over the communication port with the test apparatus. The connection of test and measurement probes to various locations within the product under test may be prompted and directed by the product under test in response to results obtained by the test apparatus and returned to the PUT's MPU system. In addition, logic stimulus test signals may be directed over the communication port from the PUT's MPU system to be injected via a logic stimulus probe into predetermined points within the circuits of the product under test to permit self diagnosis of circuit faults, the results being obtained and returned by the test and measurement probes mentioned above.

It is therefore one object of the present invention to provide a diagnostic extender test apparatus incorporating analog and digital measurement functions and logic stimulus functions for obtaining a complete diagnostic picture of a processor-based product under test.

It is another object to provide a diagnostic extender test apparatus which is operable as a stand-alone instrument or as a peripheral of a processor in a product under test.

It is a further object to provide a test apparatus which interacts and communicates with a product under test in diagnosing faults and providing performance and measurement checks.

Other objects and attainments of the present invention will become apparent to those skilled in the art upon a reading of the following detailed description when taken in conjunction with the drawings.

DRAWINGS

FIG. 2 shows a detailed block diagram of the preferred embodiment of the apparatus shown in FIG. 1; and FIG. 3 shows a front panel layout and probe arrangement for a diagnostic extender test apparatus.

DETAILED DESCRIPTION OF THE INVENTION

Figure 1:
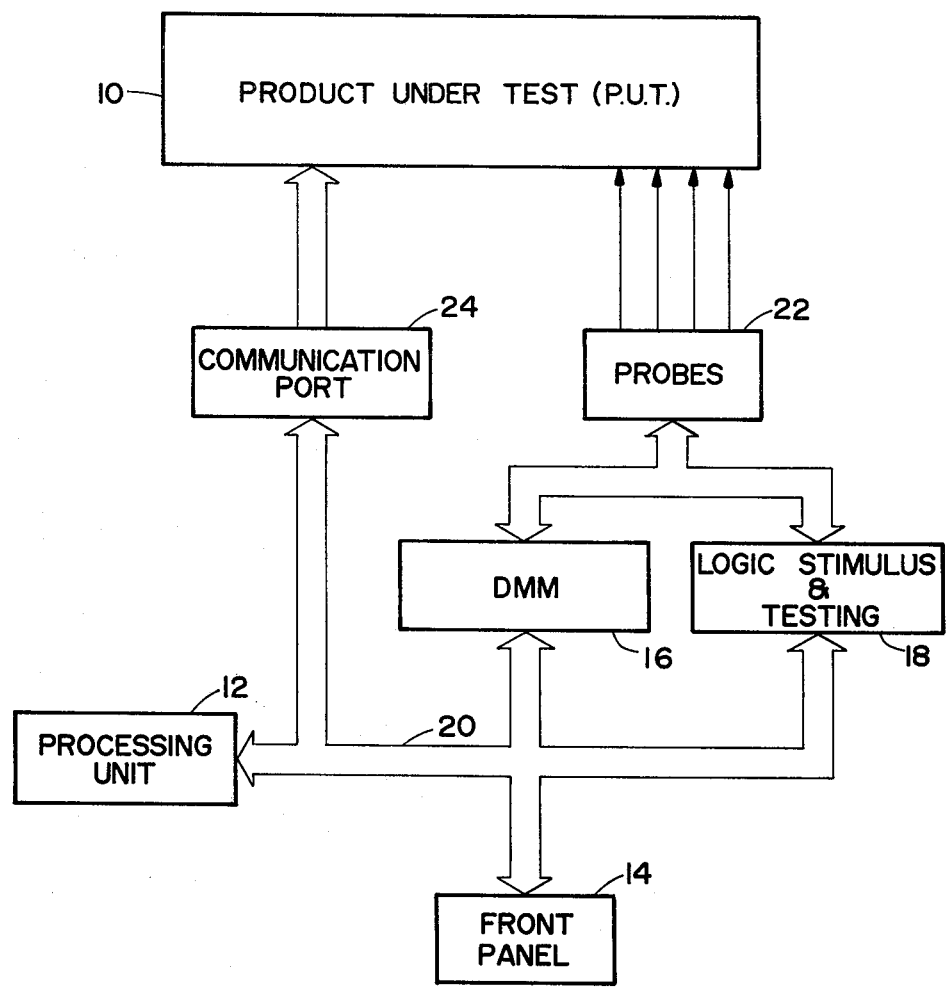
FIG. 1 shows a simplified block diagram of a diagnostic extender test apparatus in accordance with the present invention.

FIG. 1 shows a simplified block diagram of a diagnostic extender test apparatus for a processor-based product under test (PUT) 10 in which a processing unit 12, a front panel control unit 14, a digital multimeter (DMM) 16, and a logic stimulus and testing circuit 18 are interconnected by a bus 20, which includes data bus, address bus, and control bus lines to provide interactive communication between the various units in the conventional manner. The processing unit 12 may suitably be an MPU and associated RAM's and ROM's for processing and storing data in accordance with predetermined programs or instructions from front panel control unit 14. Front panel control unit 14 may suitably include a keyboard, mode-selection and function-selection switches, and a display device to provide interface with a human operator.

The diagnostic extender test apparatus includes test probes 22 associated with the DMM 16 and logic stimulus and testing unit 18 to be connected to various points within the PUT 10. The logic stimulus is generated by the internal diagnostics of the PUT and applied as test signals to points within the PUT, and the resulting diagnostic data and information is collected and returned to the processor within the PUT. The test probes 22 may therefore include data probes, logic probes, signature analysis probes, and linear probes for analog measurements. An external MPU communication port 24 permits the diagnostic extender test apparatus to be connected to the internal bus of the PUT 10. Since the diagnostic extender apparatus essentially becomes a peripheral device of the processor inside the PUT and acts in concert therewith, the test apparatus must be set up in the correct location of the PUT's processor system, and the internal diagnostics of the PUT must be written to communicate over the communication port with the test apparatus. The connection of the test probes 22 to various locations within the PUT may be prompted and directed by the PUT's processor in response to results obtained by the diagnostic extender test apparatus.

As a stand-alone instrument, the diagnostic extender test apparatus may be utilized in a variety of test and measurement functions, including diagnosis of faults within the PUT kernel. The PUT kernel comprises those elements essential to the PUT's operation, such as its processor, memories, bus, clocks, and so forth.

In FIG. 2, a product under test (PUT) 30 is shown generally enclosed by a dashed line. Here, the PUT 30 includes a system such as a central processing unit (CPU) 32 and one or more peripheral units 34 interconnected by a PUT bus 36. Such a system may suitably be one of the many commercially-available families of integrated-circuit microprocessors, including any necessary RAM's and ROM's. Circuits 38 within the PUT 30 may include both digital and analog circuits for carrying out whatever tasks the PUT is designed to do, and, in addition, a signal generator 40 may also be included for generating test signals such as start, stop, and clock signals for signature analysis.

The diagnostic extender test apparatus includes an MPU 44, a RAM 46, and a ROM 48 interconnected by a bus 50. Diagnostic fault location and measurement circuits are connected to the bus, and may include a DMM 52, a logic analyzer 54, a signature analyzer 56, and a digital counter 58. A keyboard 60 and an alpha-numeric display device 62 may also be connected to the bus 50 to provide an operator interface with the system.

The microprocessor system of the diagnostic extender test apparatus may be connected to the processing system of PUT by connecting bus 50 to bus 36 via a CPU personality interface 64 and a connection device 66. The CPU personality interface 64 provides compatability between the diagnostic extender test apparatus and the particular type of CPU employed by the PUT, and causes the diagnostic extender test apparatus to appear to the PUT CPU as a peripheral device. As mentioned previously, the internal diagnostics of the PUT must be written to communicate with the diagnostic extender test apparatus, which has its own selectable address within the address space of the PUT CPU and is therefore addressed by the CPU in the same manner as any of the CPU's peripherals. A logic stimulus probe may be connected to the bus 50 for connection to various signal-injection points 70 within the circuits 38 of the PUT. The internal diagnostics of the PUT may permit CPU 32 to call up certain test signals from the peripheral units 34 to be applied over the interface 64 and via the logic stimulus probe to predetermined signal-injection points 70 within the PUT circuits 38 to thereby provide external stimulation of certain circuits for diagnostic purposes. While the logic stimulus probe 68 shows a single tip or lead 72 connected to a signal-injection point 70 to provide a signal path for serial bit streams, signal lead 72 could also be four or more leads to provide a path for parallel digital data. One or more probes may be provided to be connected to various points 74 within the PUT 30 to collect diagnostic data resulting from logic stimulation and information for processing. Shown are a data probe 76 and a signature analysis control signal probe 78; however, other probes, such as a logic probe or a linear probe, may also be used, depending upon the test or measurement situation. While the data probe 76 shows a single input lead 80 connected to a test point 74, input lead 80 actually could be four or eight leads, or more, to provide an input for parallel digital data. The signature analysis control probe is connectable to signal generator 40 to provide an input for the start, stop, and clock signals required to generate signatures. Probes 76 and 78 may suitably include input buffering and automatic threshold level adjustment. One such probe of this type is the Tektronix P6451 Data Acquisition Probe. A signal switching circuit 84 is provided to route the acquired raw data to the appropriate measurement circuit or directly over the bus 50 to the MPU 44 for processing. The signal switching circuit 84 may be operated in response to program commands from CPU 32 or MPU 44, or in response to control signals entered into the keyboard 60. Further, the connection of the logic stimulus probe and the test and measurement probes to various locations within the PUT 30 may be prompted and directed by CPU 32 in response to results obtained by the test apparatus. A communications interface 86 is connected to bus 50 to provide transmission of data from the diagnostic extender test apparatus to other systems. For example, communications interface 86 suitably may provide RS-232 or General Purpose Interface Bus compatibility.

FIG. 3 illustrates one physical embodiment of the diagnostic extender test apparatus in which most of the circuitry is contained in a portable housing 100. The CPU communication port comprises a clip-type connector 102 for attaching to the PUT CPU, a ribbon-cable bus 104, and a CPU personality interface pod 106. A logic stimulus probe 108 connected to the apparatus via a cable 110 may be provided, and this probe may be a single-tip device as shown, or may comprise multiple tips or leads, depending on whether stimulus signals which are applied to a device under test are serial or parallel logic bits. One or more data acquisition probes 112 connected to the apparatus via cable 114 may be provided. The data acquisition probe 112 accepts a plurality of probe-input lead connectors 116 for connection to the PUT internal circuitry. Also shown is a single-input data probe 118 connected to the apparatus via a cable 120. The front panel includes a keyboard 122, an alpha-numeric display 124, mode-selection switches 126, analog function selection switches 128, and digital function selection switches 130. With the mode selection switches 122 set to Internal and the connector 102 clipped onto the PUT CPU, the diagnostic extender test apparatus operates in concert with the internal diagnostic programs of the PUT to apply stimulus signals, locate faults, and make measurements within the PUT, with test results and operator prompting being displayed alpha-numerically by the display 124 as discussed hereinabove in connection with FIG. 2. With the mode selection switches 126 set to Manual, the diagnostic extender test apparatus may be operated as a stand-alone service instrument.

While there has been shown and described the preferred embodiment according to the present invention, it will be apparent to those skilled in the art that many changes and modifications may be made without departing from the invention in its broader aspect. It is therefore contemplated that the appended claims will not be construed in a limiting sense and will cover any such modifications or embodiments as fall within the true scope of the invention.

What I claim as being new is:

1. A diagnostic extender test apparatus for use with a product under test (PUT) having a central processing system which includes stored diagnostic instructions and is capable of generating logic stimulus signals, comprising:

- a communication port for interconnecting said test apparatus with the central processing system of said PUT;
- means coupled to said communication port for receiving logic stimulus signals from said central processing system and applying said logic stimulus signals to predetermined signal injection points within the PUT;
- analog and digital test and measurement means coupled to said communication port for receiving signals from selected test points within the PUT and producing test and measurement results in response thereto, said results being returned through said communcation port to said central processing system.

2. A diagnostic extender test apparatus in accordance with claim 1 wherein said communication port comprises a CPU personality interface compatible with the central processing system of said product under test.

3. A diagnostic extender test apparatus in accordance with claim 1 wherein said test and measurement means includes at least a digital multimeter.

4. A diagnostic extender test apparatus in accordance with claim 1 further comprising display means for displaying said test and measurement results.

5. A diagnostic extender test apparatus in accordance with claim 1 further comprising a second central processing system coupled to said communication port and to said analog and digital test and measurement means.

6. A diagnostic extender test apparatus in accordance with claim 5 wherein said second central processing system comprises a microprocessor unit, a random-access memory, and a read-only memory interconnected by a bus.

7. A diagnostic extender test apparatus in accordance with claim 6 further comprising a front panel control unit including function-selecting means and display means.

* * * * *